Figure 1:
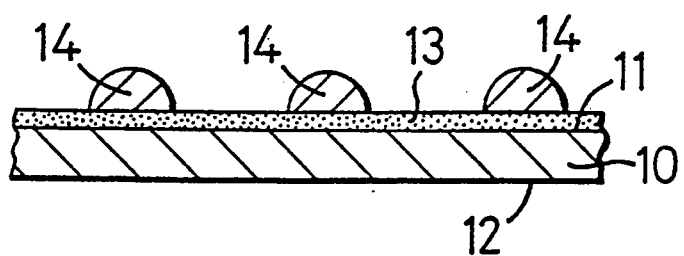

United States Patent [19]

Sanders

[11] Patent Number: 5,344,693
[45] Date of Patent: Sep. 6, 1994

[54] COMPONENT WITH SPACING MEANS

[76] Inventor: Bernard Sanders, Mont Clos, Old Beaumont Hill, Jersey, Channel Islands

[21] Appl. No.: 927,518
[22] PCT Filed: Mar. 15, 1991
[86] PCT No.: PCT/GB91/00411
§ 371 Date: Sep. 16, 1992
§ 102(e) Date: Sep. 16, 1992
[87] PCT Pub. No.: WO91/13752
PCT Pub. Date: Sep. 19, 1991

[30] Foreign Application Priority Data

Mar. 16, 1990 [GB] United Kingdom ............. 9005948.6

[51] Int. Cl.⁵ ................................................. B32B 9/00
[52] U.S. Cl. ..................................... 428/167; 428/40; 428/62; 428/97; 428/107; 428/292; 428/294; 428/327; 428/343; 428/355
[58] Field of Search ............... 428/167, 906, 172, 40, 428/156, 131, 343, 62, 97, 107, 292, 294, 327, 355

[56] References Cited

U.S. PATENT DOCUMENTS

| 3,312,005 | 10/1962 | McElroy | 428/40 |
| 4,237,889 | 12/1980 | Gobran | 128/287 |
| 4,392,897 | 7/1983 | Herrington | 156/66 |
| 4,410,130 | 10/1983 | Herrington | 383/62 |
| 4,556,595 | 12/1985 | Ochi | 428/143 |
| 5,080,957 | 1/1992 | Leseman et al. | 428/187 |

Primary Examiner—Patrick J. Ryan
Assistant Examiner—Abraham Bahta
Attorney, Agent, or Firm—Godfrey & Kahn

[57] ABSTRACT

A component in the form of a substrate (10) comprises spacing means (14) extending in a direction outwardly from a surface (11) of the substrate (10) which spaces the surface (11) and any substance (13), such as an adhesive, carried thereon from any other surface when located adjacent the component. The spacing means (14) has a nonadhesive contactable surface and is nondeformable in normal use of the component so as to inhibit contact between the said surface (11), or any substance (13) carried thereon, and the said other surface.

9 Claims, 3 Drawing Sheets

COMPONENT WITH SPACING MEANS

This invention relates to a unitary component comprising a substrate having a surface and a plurality of non-interconnecting spacing means extending in a direction outwardly from the said surface such that the said surface is spaced from contact with another surface when located adjacent the component.

There are many instances where it is necessary to maintain separation of a surface carrying an adhesive and an adjacent surface until it is required that the two surfaces shall unite one with another by the adhesive.

In U.S. Pat. No. 4,392,897 and U.S. Pat. No. 4,519,095 there is disclosed a manufacturing process for applying to a plastics film a channel shaped plastics strip having an adhesive extending longitudinally therein. An object of the process is to provide a bag closure by coextruding the strip on to a moving web of plastics film which subsequently is formed into plastics bags.

The composition of the strip is such that the spaced parallel ribs which comprise opposite facing walls of the channel section located on a wall of a bag are deformed away from one another when the wall is engaged under pressure by an opposite facing wall of the bag. In consequence, the ribs do not prevent unintentional closure of the bag and if the adhesive is aggressive such premature closure could render the bag useless.

Furthermore, coextrusion of the strip and the web requires costly, complex and dedicated machinery with a requirement of sophisticated control.

In each of U.S. Pat. No. 3,592,722 and WO 87/05315 there is disclosed a method of holding off contact between two surfaces, one of which is provided with an adhesive, by locating particles between the surfaces. A disadvantage of such an arrangement if one of the two surfaces is a plastics film which is to be wound into a reel, is that the pressure in a radial direction inwardly towards a central longitudinal axis of the reel resulting from winding of successive turns of the web causes the particles to be forced into the adhesive and become embedded therein thereby reducing the efficacy of the separation provided by the particles. In consequence, the two surfaces are united over a greater area and the reel becomes "blocked", i.e. the turns become adhesively secured one to another with a result that it would be impossible to unwind the reel.

Accordingly, it is an object of the present invention to provide a means of spacing a substance carried on a surface of a substrate from another surface in such a manner as to prevent unintentional contact between the substance and the other surface, the substance and the other surface being contactable one with another only by deforming the substrate and/or the other surface.

A further object of the present invention is to provide simple and inexpensive methods of producing substrates including spacing means.

Another object of the present invention is to provide a method of applying a component to a web of material in such a manner as to form a closure for a bag.

A further object of the present invention is to provide a method of forming a separation means integral with the substrate.

The invention is characterised in that spacing means each having a non-adhesive contactable surface and are non-divergent relative one to another in normal use of the component so as to inhibit contact between the said surface and the said other surface.

Following is a description, by way of example only and with reference to the accompanying drawings, of one method of carrying the invention into effect.

Figure 2:
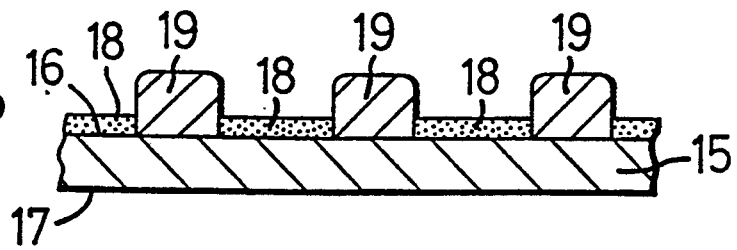
Figure 3:
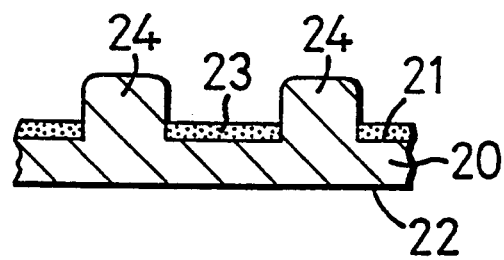
Figure 4:
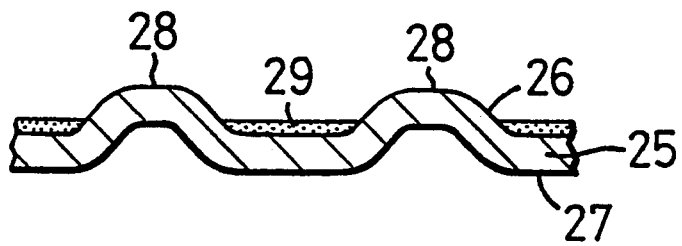
Figure 5:
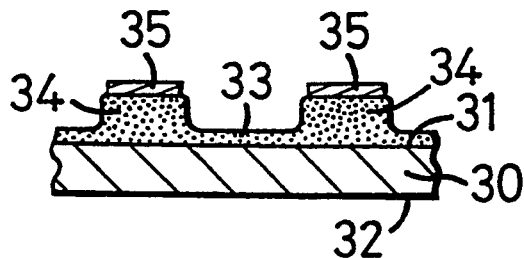
Figure 6:
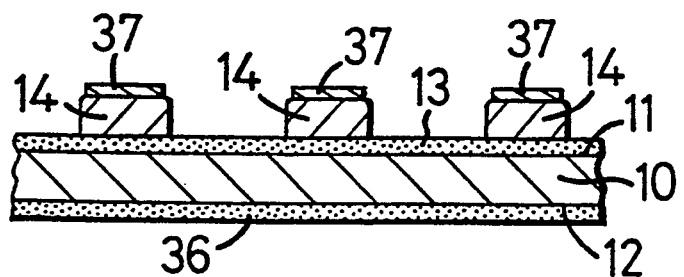
Figure 7:
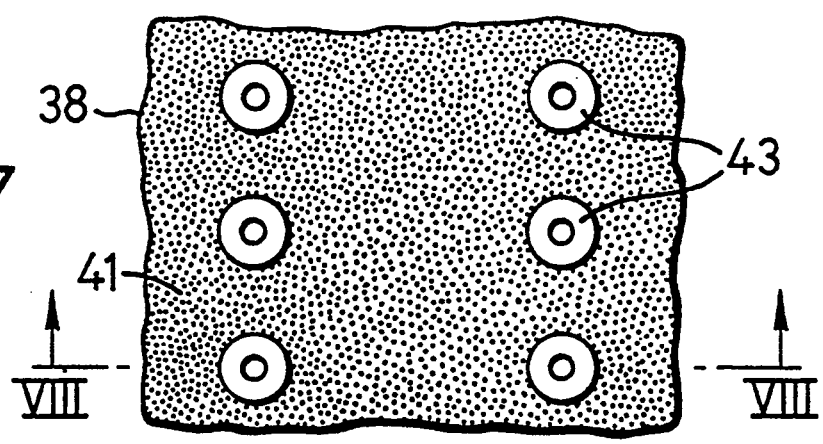
Figure 8:
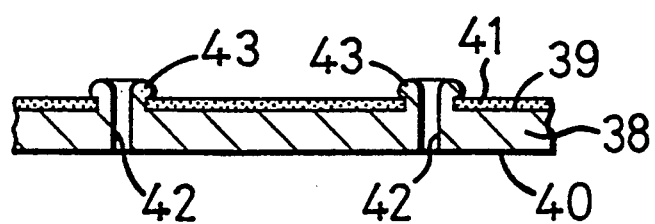
Figure 9:
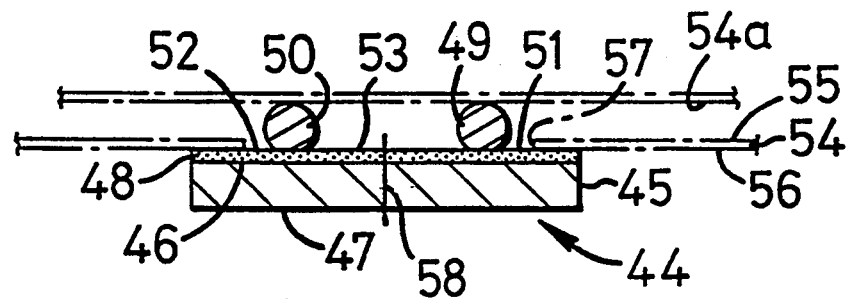

In the drawings:

FIG. 1 is a diagrammatic transverse cross-section of one embodiment of a component in accordance with the present invention, FIG. 2 is a diagrammatic transverse cross-section of another embodiment of a component in accordance with the present invention, FIG. 3 is a diagrammatic transverse cross-section of another embodiment of a component in accordance with the present invention, FIG. 4 is a diagrammatic transverse cross-section of another embodiment of a component in accordance with the present invention, FIG. 5 is a diagrammatic transverse cross-section of another embodiment of a component in accordance with the present invention, FIG. 6 is a diagrammatic transverse cross-section of another embodiment of a component in accordance with the present invention, FIG. 7 is a plan view of another embodiment of a component in accordance with the present invention, FIG. 8 is a cross-section on the line VIII—VIII of FIG. 7, FIG. 9 is a diagrammatic transverse cross-section of another embodiment of a component in accordance with the present invention.

Figure 10:
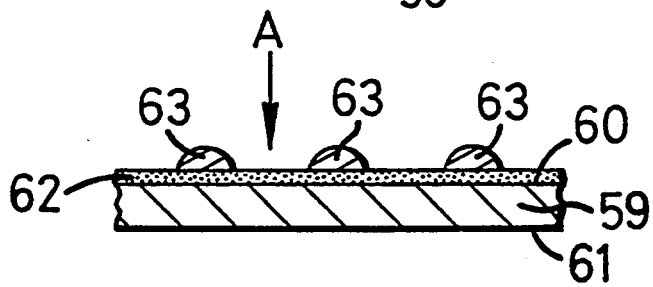
Figure 11:
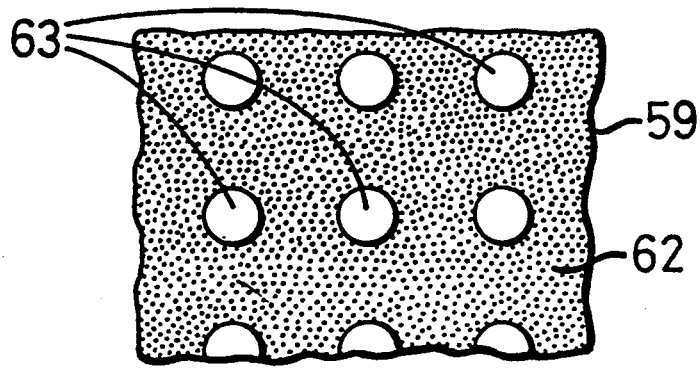

FIG. 10 is a diagrammatic transverse cross-section of another embodiment of a component in accordance with the present invention, FIG. 11 is a view in the direction of the arrow "A" of FIG. 10.

Figure 12:
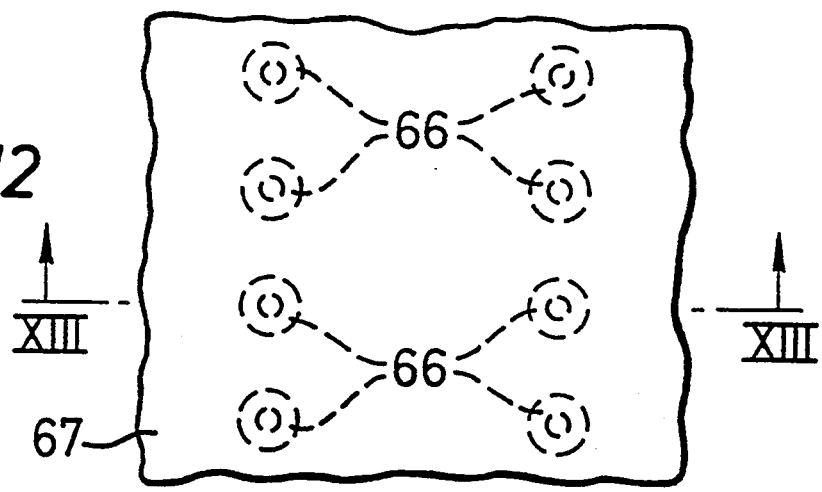
Figure 13:
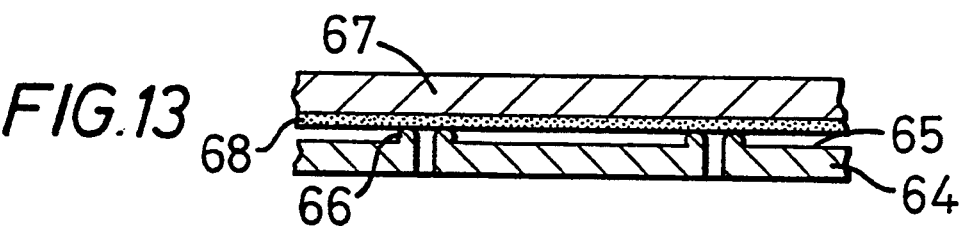
Figure 14:
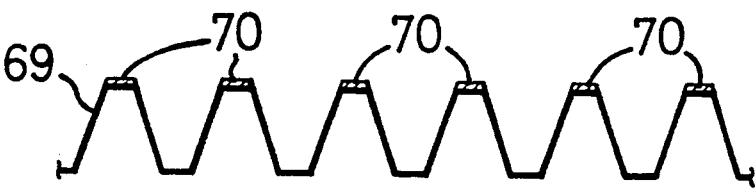
Figure 15:
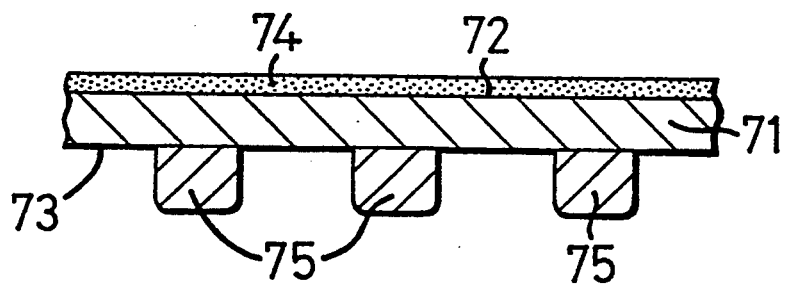

FIG. 12 is a plan view of another embodiment of a component in accordance with the present invention, FIG. 13 is a cross section on the line XIII—XIII of FIG. 12, FIG. 14 is a cross section of another embodiment of a component in accordance with the present invention, and FIG. 15 is a diagrammatic transverse cross section of another embodiment of a component in accordance with the present invention.

Referring now to FIG. 1 of the drawings, there is shown a web 10 of flexible material having an upper surface 11 and a lower surface 12. The upper surface 11 is coated with a substance 13, such as a pressure sensitive contact adhesive which may be peelable or permanent or a cohesive being an adhesive which adheres only to itself. The adhesive 13 has located thereon a plurality of upstanding spacer members 14 each being spaced from an adjacent member 14.

When the web 10 is wound into a reel, the spacer members 14 have the effect of separating the surfaces 11 and 12 from one another and thereby prevent undesirable contact between the surface 12 and the adhesive 13 and/or transfer of the adhesive 13 from the surface 11 to the surface 12.

The web 10 may thus take the form of an adhesive web which does not require the presence of a release coating on the lower surface 12 to ensure that adhesive 13 is not either partially or wholly transferred when the web 10 is reeled.

It will be appreciated that the adhesive characteristics of such a web would not be impaired by the presence of the spacer members 14 if the spatial relationship of the members 14 one from another and the dimension of each of the members 14 in a direction outwardly from the surface 11 beyond the adhesive 13 is such as to ensure that the adhesive 13 remains spaced from contact with any surface extending across the members 14 and yet is such as to permit contact between the adhesive 13 and any surface extending across the spacer members 14 on flexure of either or both of the web 10 and the surface.

The spatial relationship of the members 14 one from another may be a distance not exceeding eighty units of the dimension of each member 14 in the direction outwardly from the surface 11 beyond the adhesive 13.

Referring now to FIG. 2 of the drawings, there is shown a web 15 of flexible material having an upper surface 16 and a lower surface 17. The upper surface 16 is coated with a pattern of adhesive 18 and a complementary pattern of upstanding spacer members 19 each being spaced from an adjacent member 19. The dimension of the adhesive 18 upwardly from the upper surface 16 is less than the dimension of each spacer member 19 in the same direction thereby ensuring that the adhesive 18 is spaced from any surface bridging the spacer members 19.

In FIG. 3 of the drawings there is shown a configuration similar to the configuration shown in FIG. 2 in that there is provided a web 20 of flexible material having an upper surface 21 and a lower surface 22, the upper surface 21 being coated with a pattern of an adhesive 23 and there being a complementary pattern of upstanding spacer members 24 each being spaced from an adjacent member 24. However, unlike the configuration shown in FIG. 2, the upstanding spacer members 24 are formed integrally with the web 20.

Referring now to FIG. 4 of the drawings, there is shown a web 25 of flexible material having an upper surface 26 and a lower surface 27. The web 25 is profiled or contoured so as to provide a pattern of upstanding spacer members 28. The upper surface 26 of the web 25 is provided with a pattern of an adhesive 29 which is complementary to the upstanding spacer members 28 in that the adhesive 29 is provided on the upper surface 26 between the upstanding spacer members 28.

In FIG. 5 of the drawings there is shown a web 30 of flexible material having an upper surface 31 and a lower surface 32. The upper surface 31 is provided with a coating of an adhesive 33 which is formed to provide a plurality of upstanding members 34 extending upwardly from the surface 31 beyond the uniform thickness of the coating 33. The upper surface of each of the upstanding members 34 is coated with a non-adhesive substance 35 so that, when the web 30 is reeled the lower surface 32 of the web is not adhesively united with the members 34.

In each of the embodiments shown in FIGS. 1 to 5 inclusive, each of the upstanding spacer members 14, 19, 24, 28, and 34, of the webs 10, 15, 20, 25 and 30 may be elongate and may extend longitudinally of the corresponding webs 10, 15, 20, 25 and 30. Furthermore, each of the webs 10, 15, 20, 25 and 30 may be slit longitudinally to form a plurality of tapes each comprising a pair of upstanding members 14, 19, 24, 28, 34 extending from a substrate 10, 15, 20, 25 and 30 beyond a coating of adhesive 13, 18, 23, 29, 33 on a substrate 10, 15, 20, 25 and 30. The lower surface 92, 17, 22, 27 and 32 of each of the webs 10, 15, 20, 25 and 30 may be coated with a pressure sensitive contact adhesive so that the web 10, 15, 20, 25, 30, or tapes slit therefrom, may be applied to another surface. In FIG. 6, for example, the web 10 of the embodiment shown in FIG. 1 is provided on the lower surface 12 thereof with a pressure sensitive contact adhesive 36. However, if each of the webs 10, 15, 20, 25 and 30 is provided with a pressure sensitive contact adhesive on a lower surface thereof and the web, or tapes slit therefrom, are wound into reel formation, it will be necessary to provide upper surfaces of the spacer members 14, 19, 24, 28 and 34 with a release coating to ensure that the reel does not become "blocked". In FIG. 6, for example, the release coating is shown at 37. Alternatively, the spacer members 14, 19, 24, 28 and 34 may be or may include a release substance.

Referring now to FIGS. 7 and 8 of the drawings there is shown a web 38 of flexible material having an upper surface 39 and a lower surface 40. The upper surface 39 is provided with a coating of pressure sensitive contact adhesive 41 and the web 38 is provided with a plurality of apertures 42 formed by inserting hot needles through the web 38 the effect being that portions of the web 38 extending circumferentially of each of the apertures 42 form annular cusps which, on cooling, provide spacer members 43 extending circumferentially of each aperture 42 outwardly of the adhesive layer 41 in a direction away from the upper surface 39 of the web 38.

The lower surface 40 of the web 38 may be provided with a coating of pressure sensitive adhesive.

Each of the webs of the embodiments described above may be provided with lines of weakening so that the webs may be separated into tapes.

Referring now to FIG. 9 of the drawings there is shown, in cross-section, a tape 44 comprising a substrate 45 having an upper surface 46 and a lower surface 47. The upper surface 46 is coated with a pressure sensitive contact adhesive 48 and the adhesive has adhered thereto a pair of spacers 49, 50 extending parallel one to another and longitudinally of the substrate 45. The spacers 49, 50 are spaced inwardly from corresponding longitudinal edges of the tape 45 to provide exposed margins 51, 52 of the adhesive 48 and the spacers 49, 50 are spaced transversely one from another to provide a central exposed strip 53 of the adhesive 48.

The tape 44 is intended to be used as a closure device for bags made from a web of plastics film material 54 having an upper surface 55 and a lower surface 56 and provided with a longitudinal slot 57. The tape 44 is applied to the lower surface 56 of the web 54 such that the marginal portions 51, 52 of the adhesive 48 unite with corresponding margins of the lower surface 56 of the web 54 adjacent the slot 57. During manufacture of the bags, the web 54 is formed to provide two layers, one containing the slot 57 and the other being superimposed on the spacers 49, 50, as shown at 54a the two layers forming opposite facing walls of completed bags and the bags being closed by deforming the substrate 45 or the opposite facing layer 54a formed from the web 54 or both the substrate 45 and the opposite facing layer 54a so that the central portion 53 of the adhesive 48 unites the substrate 45 and the opposite facing layer 54a to effect closure of the bags.

The adhesive 48 may be a peelable adhesive so that the bags can be opened and reclosed repeatedly. Alternatively, the adhesive 48 may be an aggressive adhesive to effect permanent closure of the bags. If so, the substrate 45 may be provided with a longitudinal line of weakening 58 extending between the spacers 49, 50 so that when the bag is opened by severing the material of the substrate 45 longitudinally of the line of weakening 58 evidence of such opening is effected.

Referring now to FIGS. 10 and 11 of the drawings, there is shown a web 59 of flexible material having an upper surface 60 and a lower surface 61. The upper surface 60 is coated with an adhesive or cohesive substance 62 and the substance 62 carries a pattern of non-adhesive, preferably thermoplastic or ink, spacers 63 which are united with the substance 62. The spacers 63 may be applied to the substance 62 by means of a printing process. The spacers 63 may comprise substances including expandable microspheres.

It will be appreciated that the spacers 63 may comprise profiled elongate members.

It will also be appreciated that, with each of the embodiments referred to above, the spacing means and/or the adhesive may be coloured so as to provide positive identification.

Furthermore, it will be appreciated that a component in accordance with the present invention may not be provided with an adhesive. In FIGS. 12 and 13, for example, there is shown a web 64 having a surface 65 and spacing means 66 extending in a direction outwardly from the surface 65. The arrangement is similar to the web 38 except that the surface 65 of the web 64 is not provided with an adhesive layer. The web 64 provides a peelable backing strip for an adhesive tape or label 67 whereby the web 64 comprises the backing strip and the spacing means 66 separates the said surface 65 of the web 64 from contact with adhesive 68 of the tape or label 67.

Similarly, in FIG. 14 there is shown an embossed web 69 of polyethylene film which, in cross section, is of wave formation. An upper surface of the film is coated with a release substance, such as silicone, only on the crests of the wave formation, as shown at 70. The portions of the wave formatlob between the crests and the troughs comprise spacing means and the web 69 also can be used as a peelable backing strip for an adhesive tape or label because the crests, being coated with the release substance, provide the facility which enables the backing strip to be peeled from the adhesive of the tape or label.

It will be appreciated that other embodiments may be constructed in accordance with the present invention. For example, a component may comprise an adhesive tape having a perforated backing layer united with an adhesive coating of the tape. The backing layer provides spacing means which spaces the adhesive from any other surface with which the backing layer may be placed in contact. However, the tape may be secured to the other surface by means of the adhesive by deforming the tape and/or the other surface so that the surface and the adhesive unite one with another through apertures of the perforated layer.

Another embodiment of a component in accordance with the present invention is shown in FIG. 15 and comprises a web 71 of flexible material having an upper surface 72 and a lower surface 73. The upper surface 72 is coated with a pressure sensitive contact adhesive 74 which may be peelable or permanent and the lower surface 73 has located thereon or formed integrally therewith a plurality of depending spacer members 75.

As with the embodiment shown in FIG. 1, when the web 71 is wound into a reel, the spacer members 75 have the effect of separating the surface 73 of the web 71 from the adhesive 74 and thereby eliminate the need for a release coating. This is because the surface area of the spacer members 75 which contact the adhesive 74 is small compared with the surface area of the lower surface 73 and, on unwinding of the reel, the spacer members 75 detach from the adhesive 74.

I claim:

1. A unitary adhesive component for adhering to an object of interest, the adhesive component comprising:
    a substrate having an upper surface and a lower surface and;
    a plurality of non-interconnecting spacing means extending in a direction outwardly from the upper surface and having a given height dimension, and a distal non-adhesive contactable surface; and
    a coating of adhesive applied to the upper surface of the substrate and positioned between the non-interconnecting spacing means, the coating of adhesive having a thickness dimension which is less than the height dimension of the non-interconnecting spacing means, and wherein the upper surface is disposed in spaced relation relative to the object of interest when located adjacent the adhesive component, and wherein the non-interconnecting spacing means in normal use is non-deformable thus substantially inhibiting contact between the upper surface and the object of interest until force is applied to the object interest thereby causing the object of interest to be deflected into contact with the coating of adhesive.

2. An adhesive component as claimed in claim 1 and wherein the non-adhesive contactable surface comprises a substance which facilitates separation from the object of interest.

3. An adhesive component as claimed in claim 2, and wherein the spacing means is made integral with the upper surface of the substrate by means of the adhesive coating, 4. An adhesive component as claimed in claim 3 and wherein a plurality of apertures are formed in the substrate and the spacing means comprises a plurality of annular members each extending circumferentially of a corresponding one of the apertures.

5. An adhesive component as claimed in claim 1 and wherein a coating of adhesive is applied to the lower surface of the substrate.

6. An adhesive component as claimed in claim 1, and wherein the substrate is provided with a line of weakening.

7. An adhesive component as claimed in claim 5, and wherein the spacing means comprises a plurality of members arranged such that each member is spaced from an adjacent member a distance not exceeding eighty units of a dimension of the spacing means in a direction outwardly from the upper surface of the substrate.

8. An adhesive component as claimed in claim 1 and wherein the spacing means is made integral with the upper surface of the substrate.

9. An adhesive component for adhering to an object of interest comprising:
    a substrate having an upper surface, and a lower surface;
    a pair of substantially non-deformable ribs borne by the upper surface of substrate, and disposed in predetermined spaced relation one to the other, the individual ribs having a given height dimension, and further having a distal non-adhesive contactable surface; and an adhesive coating applied to the upper surface of the substrate and positioned in the area between the respective ribs, the adhesive coating having a thickness dimension less than the given height dimension of the respective ribs, and wherein the respective ribs position the object of interest in spaced, bridging relation relative to the coating of adhesive, and wherein forcible deformation of the object of interest in the vicinity of the adhesive component moves the object of interest into contact with the adhesive coating.

* * * * *